Dec. 22, 1959  A. C. MILLER  2,918,018
FLUID PUMP OR MOTOR
Filed Oct. 29, 1956  2 Sheets-Sheet 1

INVENTOR.
Allyn C. Miller
BY
Attorney

Dec. 22, 1959 A. C. MILLER 2,918,018
FLUID PUMP OR MOTOR
Filed Oct. 29, 1956 2 Sheets-Sheet 2
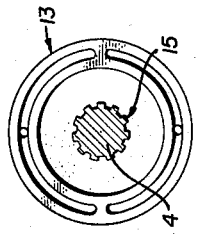
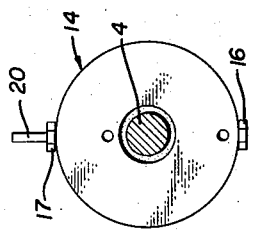
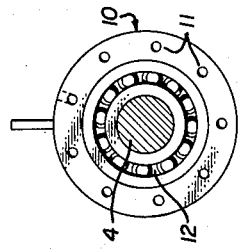
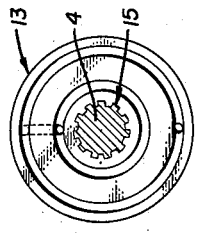
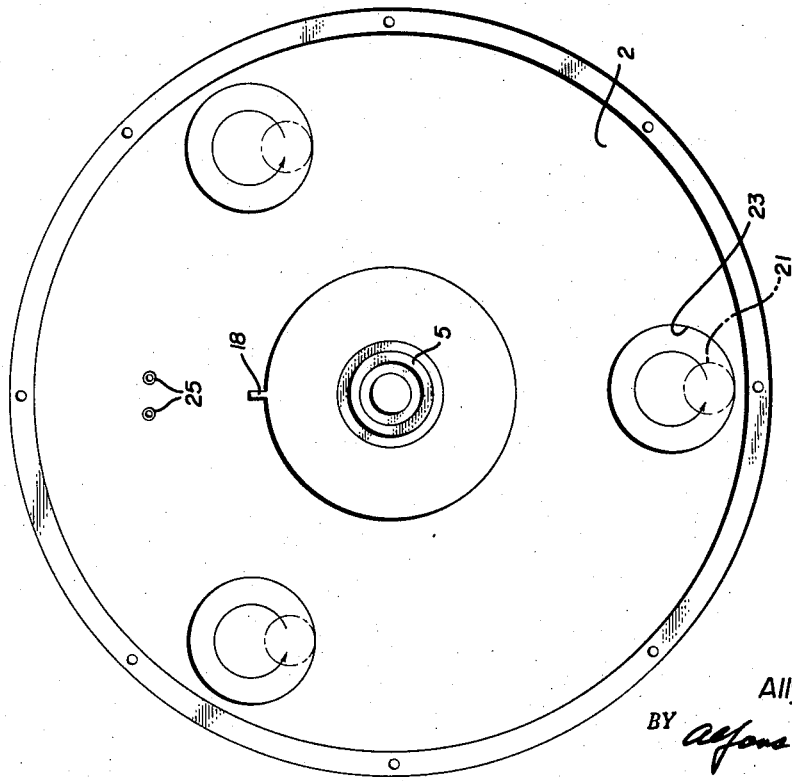
INVENTOR.
Allyn C. Miller
BY
Attorney

United States Patent Office 2,918,018
Patented Dec. 22, 1959

2,918,018

FLUID PUMP OR MOTOR

Allyn C. Miller, Palo Alto, Calif.

Application October 29, 1956, Serial No. 618,896

12 Claims. (Cl. 103—148)

This invention relates to an improved pump, meter, or motor utilizing a plurality of bellows in an unusual configuration and arrangement so as to produce better characteristics of flow and motion than that possessed by existing types.

Pumps and meters for the movement and measuring of fluids, or motors utilizing fluid motion as a source of driving power and employing one or more bellows in combination with suitable means for producing or utilizing the reciprocating feature characteristic of the collapsible bellows, with its attendant advantages, have been in use for some time. These are generally unsatisfactory since they are cumbersome and produce a pulsating or fluctuating pressure and flow. Furthermore, no existing apparatus embodies any mechanical advantage or total pressure or force amplification within itself.

It is the object of my invention to produce a means of maintaining a positive and continuous flow of fluid at constant pressure plus an amplification of pressure, in the case of pumping and an amplification of force in the case of metering or driving.

This I accomplish by employing bellows having a conical shape or tapered longitudinal section and so disposing them radialy as to utilize the maximum displacement volume possible per revolution for given overall dimensions.

By employing more than one radial row in parallel and disposed axially I am able to obtain an absolutely continuous flow at constant pressure which is tantamount to a centrifugal type pump but at the same time possesses all the advantages of a positive type of apparatus.

I am able to achieve a similar result by utilizing a sufficient number of bellows having the usual cylindrical shape but find that this is more cumbersome and less efficient than the preferred shape which I have shown.

By arranging a number of rows so that the flow is from one row to the next in series, I am able to effect also an amplification of pressure similar to that produced by a multi-staged centrifugal pump.

In the pumps now available, the practice of employing cams, cranks, rocker arms, gears and other mechanisms to effect the collapsing and expanding of the bellows is ineffectual in producing smooth operation and flow. While my invention may employ any of the aforementioned mechanisms also, I prefer to dispose my bellows radially and use a smooth, rotary motion to accomplish my purpose. I am thus able to obtain all of the advantages of a bellows type pumping, metering or driving mechanism and none of the disadvantages now encountered.

A further purpose of my invention is to eliminate the noise and vibration characteristic of positive pumping and measuring devices utilizing some form of gear, wobbler or screw action on the fluid.

A further purpose of my invention is to eliminate the fraction, wear, slippage and leakage characteristic of positive pumping and measuring devices utilizing some form of piston action on the fluid.

My invention further lends itself to easier maintenance, safer operation and more compact construction than is true of other devices of this general class now in use. It is thus suited for use in fluid transmissions and torque amplifiers, as well as in hydraulic, vapor or internal combustion propulsion, or in gas or vapor compression.

Other purposes, advantages, and uses of my invention will become apparent from the detailed description and reference to the drawings which follow.

The accompanying drawings illustrate one method of accomplishing the objects and purposes of my invention:

Figure 3 is a fragmentary section on line 3—3 looking in the direction of the arrows.

Figure 4 is a fragmentary section on line 4—4 looking in the direction of the arrows.

Figure 5 is a fragmentary section on line 5—5 looking in the direction of the arrows.

Figure 6 is a fragmentary section on line 6—6 looking in the direction of the arrows.

Figure 7 is a side elevation view on line 7—7 looking in the direction of the arrows.

Figure 2:
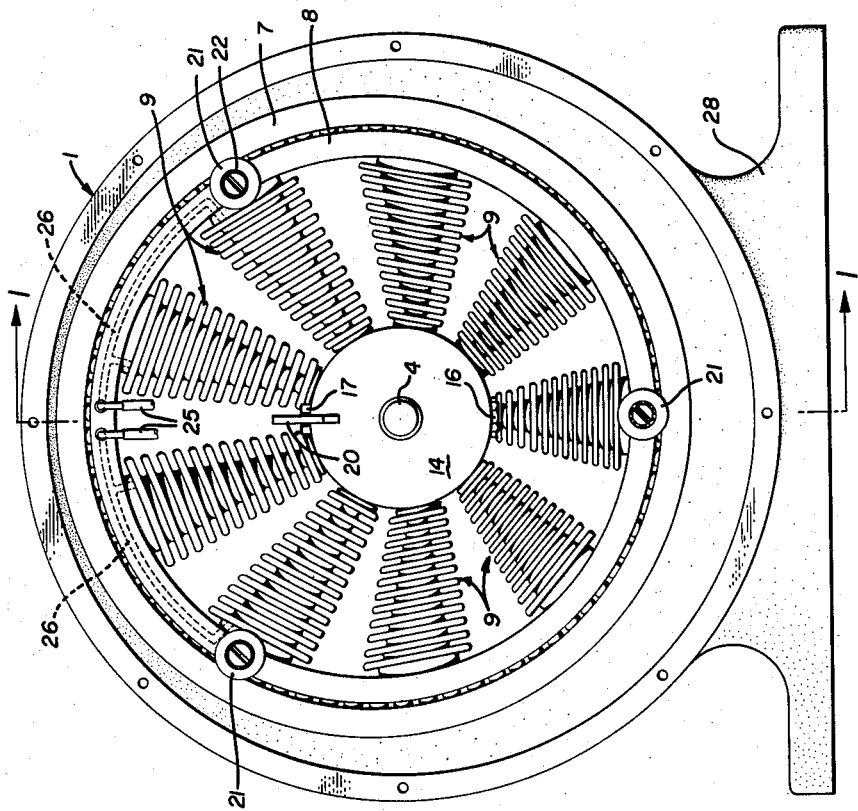
Figure 2 is a side elevation view on line 2—2 looking in the direction of the arrows.
Figure 1:
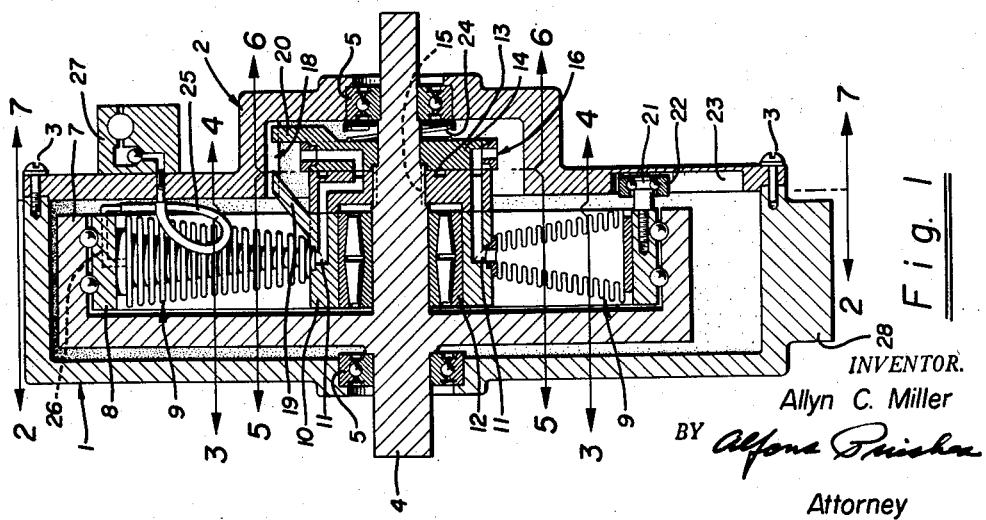
Figure 1 is an elevation of the apparatus shown in longitudinal section.

Referring now to the drawings, I have provided a casing 1, to which is fastened a cover 2, preferably by means of screws 3.

The main shaft 4 is rotatably mounted on bearings 5 and carries an eccentrically positioned outer cup 7 which provides also a bearing surface against the inner race 8. I have shown a ball bearing, but any other form of antifriction or sleeve bearing would be suitable.

To the inner race 8 there are secured one end of each of a series of bellows 9 which I prefer to make in a tapered or conical shape. The opposite or inner end of each bellows 9 is secured to the collar 10, which in turn is rotatably mounted on bearing 12.

Positioned in collar 10 are fluid passages or channels 11 which communicate with the rotating portion of automatic rotary valve 13, which is slidably fastened to main shaft 4 by means of a spline 15 or other suitable means.

The non-rotating portion of the automatic valve 14 is held in substantially leak-free friction contact with the rotating portion 13 and the collar 10 by means of spring 24.

Rotation of the non-rotating portion of valve 14 is prevented by arm 20 when it engages with slot 18. A running fit is maintained between shaft 4 and rotating portion of the automatic valve 14. The collar 10 is prevented from turning by arm 19 when it engages with slot 18.

The inner race 8 is prevented from rotating by three or more gyrating guides 21 on which are rotatably mounted bearings 22 whose motion is constrained in slots 23. The slots 23 are so proportioned as to permit the desired motion of eccentric cup 7.

The fuel passages 11 communicate with fluid inlet port 16 and fluid outlet port 17.

An air bleeder channel 26 of much smaller diameter than the fuel passages 11 provides communication between the interior of the belows 9 through the air bleeder hoses 25 and the exterior through a suitable check valve 27.

The entire assembly retained by casing 1 and cover 2 may be mounted on a base or pedestal 28.

Communication to and from the casing 1 may be made by any suitable form of piping or other means.

Having described the construction of my invention, its operation will now be detailed.

Rotation of shaft 4 produces a rotation of outer cup 7 which because of its eccentric mounting produces an alternating expansion and collapsing of the bellows 9, whose motion is constrained and guided by the combined action of the inner race 8, the collar 10 and the gyrating guides 21.

The expansion and contraction of the bellows 9 produces a continuous suction on port 16 and a pressure on port 17 through the passages 11 and the combined action of the rotating portion of automatic valve 13 and the stationary portion of automatic valve 14.

As a converse to the above operation, if fluid is introduced into the apparatus through port 16 and withdrawn through port 17, rotation may be produced in shaft 4 and my invention used as a motor or torque amplifier or for the measurement of the quantity of fluid passed through it. For this purpose I prefer to use an odd number of bellows so disposed circumferentially so that no two of them are diametrically opposite.

The advantages of using a tapered or conical bellows is obvious from the foregoing. Not only is it possible to get a maximum displacement per revolution when these are disposed radially but by combining a series of rows a positive, continuous and constant flow is obtained.

Furthermore, when used as a motor, the introduction of fluid at a given pressure to the passages 11 at the smaller diameter end of the bellows 11 produces a greater total force on the larger diameter end of the bellows and thus acts as a torque amplifier.

While I have shown and described a typical method of accomplishing the purpose of my invention which is a single embodiment only, I do not intend to limit myself thereto except as I may do so in the claims.

Having thus described my invention, what I claim as new and desire to secure by Letters Patent is:

1. A fluid displacement apparatus comprising in combination a series of bellows radially disposed, one end of each being rigidly fixed and the other being free to move, a cam suitably positioned and rotatably mounted with respect to the free end of said bellows whereby the action of said cam causes successively expanding and compressing of the said bellows and means connected to said bellows for permitting a flow of fluid to and from the interior of said bellows.

2. A fluid displacement apparatus comprising in combination a series of bellows radially disposed, one end of each being rigidly fixed and the other being free to move, a cam suitably positioned and rotatably mounted with respect to the free end of said bellows whereby the action of said cam causes successively expanding and compressing of the said bellows and means connected to said bellows for permitting a flow of fluid to and from the interior of said bellows, one end of each of said bellows having a cross-sectional area which is substantially greater than the other end.

3. A fluid displacement apparatus comprising in combination, a series of bellows, a central collar, said bellows being radially disposed around and fixedly positioned on said collar, a cylindrical housing, said collar being positioned eccentrically in said housing, said housing being positioned in slidable relation to one end of said bellows, means for rotating said housing relative to said collar whereby is produced an expansion and compression of said bellows, and means connected to said bellows for permitting flow of fluid to and from the interior of said bellows.

4. A fluid displacement apparatus comprising in combination, a series of bellows, a central collar, said bellows being radially disposed around and fixedly positioned on said collar, a cylindrical housing, said collar being positioned eccentrically in said housing, said housing being positioned in slidable relation to one end of said bellows, means for rotating said housing relative to said collar whereby is produced an expansion and compression of said bellows, and means connected to said bellows for permitting flow of fluid to and from the interior of said bellows, one end of each of said bellows having a cross-sectional area which is substantially greater than the other end.

5. A fluid displacement apparatus comprising in combination a series of bellows disposed radially, a central collar, one end of each of said bellows being fixedly mounted on said collar and the other end being free, a port positioned on the fixed end of each of said bellows and communicating with the interior of said bellows, a series of passages in said central collar, one end of each of said passages connecting to one of said ports in said bellows the other end communicating with a suitably positioned inlet and outlet valve means connected to said bellows for successively expanding and compressing the said bellows.

6. A fluid displacement apparatus comprising in combination a series of bellows disposed radially, a central collar, one end of each of said bellows being fixedly mounted on said collar and the other end being free, a port positioned on the fixed end of each of said bellows and communicating with the interior of said bellows, a series of passages in said central collar, one end of each of said passages connecting to one of said ports in said bellows the other end communicating with a suitably positioned inlet and outlet valve means connected to said bellows for successively expanding and compressing the said bellows, one end of each of said bellows having a cross-sectional area which is substantially greater than the other end.

7. A fluid displacement apparatus comprising in combination a series of bellows disposed radially, a central collar, one end of each bellows being fixedly mounted on said collar and the other end being free, passages in said central collar connecting to each bellows, a rotary valve slidably mounted on said collar, ports in said rotary valve communicating with said passages in said central collar, means connected to said valve for permitting a flow of fluid into and out of said valve, means connected to said bellows for successively expanding and compressing the said bellows.

8. A fluid displacement apparatus comprising in combination a series of bellows disposed radially, a central collar, one end of each bellows being fixedly mounted on said collar and the other end being free, passages in said central collar connecting to each bellows, a rotary valve slidably mounted on said collar, ports in said rotary valve communicating with said passages in said central collar, means connected to said valve for permitting a flow of fluid into and out of said valve, means connected to said bellows for successively expanding and compressing the said bellows, one end of said bellows having a cross-sectional area which is substantially greater than the other.

9. A fluid displacement apparatus comprising in combination a series of bellows disposed radially, a central collar, one end of each bellows being fixedly mounted on said collar and the other end being free, passages in said central collar connecting to each bellows, a rotary valve slidably mounted on said collar, ports in said rotary valve communicating with said passages in said central collar, means connected to said valve for permitting a flow of fluid into and out of said valve, means connected to said bellows for successively expanding and compressing the said bellows and means for removal of entrained vapor from the interior of said bellows.

10. A fluid displacement apparatus comprising in combination a series of bellows disposed radially, a central collar, one end of each bellows being fixedly mounted on said collar and the other end being free, passages in said central collar connecting to each bellows, a rotary valve slidably mounted on said collar, ports in said rotary valve communicating with said passages in said central collar, means connected to said valve for permitting a flow of fluid into and out of said valve, means connected to said bellows for successively expanding and compressing the said bellows and means for removal of entrained vapor from the interior of said bellows, one end of said bellows having a cross-sectional area which is substantially greater than the other.

11. In a fluid displacement apparatus of the class described, the combination of a series of bellows, a central collar, said bellows being radially disposed about said central collar, one end of each of said bellows being fixedly mounted on said collar, a cylindrical housing for said bellows, the axis of said housing being eccentrically positioned with respect to said central collar, said housing being positioned in slidable relation to said bellows, means for producing a relative rotary motion between said housing and said central collar whereby successive expansion and compression of said bellows is produced, means connected to said bellows for permitting a flow of fluid to and from the interior of said bellows.

12. In a fluid displacement apparatus of the class described, the combination of a series of bellows, a central collar, said bellows being radially disposed about said central collar, one end of each of said bellows being fixedly mounted on said collar, a cylindrical housing for said bellows, the axis of said housing being eccentrically positioned with respect to said central collar, said housing being positioned in slidable relation to said bellows, means for producing a relative rotary motion between said housing and said central collar whereby successive expansion and compression of said bellows is produced, means connected to said bellows for permitting a flow of fluid to and from the interior of said bellows, one end of each of said bellows having a cross sectional area which is substantially greater than the other end.

References Cited in the file of this patent

UNITED STATES PATENTS

| | | |
|---|---|---|
| 157,406 | Leas | Dec. 1, 1874 |
| 184,461 | Cooper | Nov. 21, 1876 |
| 862,867 | Eggleston | Aug. 6, 1907 |
| 1,109,349 | Mealey | Sept. 1, 1914 |
| 2,122,352 | Rummel | June 28, 1938 |
| 2,146,123 | Logan | Feb. 7, 1939 |

FOREIGN PATENTS

| | | |
|---|---|---|
| 12,087 | Great Britain | of 1848 |